United States Patent  
Fish

(10) Patent No.: US 6,454,251 B1  
(45) Date of Patent: Sep. 24, 2002

(54) COMPOSITE CORD ASSEMBLY

(75) Inventor: John C. Fish, 19018 Saddleback Ridge Rd., Canyon Country, CA (US) 91351

(73) Assignee: John C. Fish, Canyon Country, CA (US)

( * ) Notice: Subject to any disclaimer, the term of this patent is extended or adjusted under 35 U.S.C. 154(b) by 0 days.

(21) Appl. No.: 09/565,696

(22) Filed: May 1, 2000

(51) Int. Cl.$^7$ ................................................ F16F 1/06
(52) U.S. Cl. ..................... 267/166; 156/85; 156/149; 156/286
(58) Field of Search ......................... 267/33, 166, 287, 267/199; 248/565, 619; 156/85, 148, 149, 166, 172, 286

(56) References Cited

U.S. PATENT DOCUMENTS

| | | | | |
|---|---|---|---|---|
| 3,378,426 A | * | 4/1968 | Medney | 156/430 |
| 3,674,581 A | * | 7/1972 | Kalnin et al. | 156/84 |
| 3,711,807 A | * | 1/1973 | Yamashita et al. | 336/205 |
| 3,737,261 A | * | 6/1973 | Hardesty | 425/113 |
| 3,985,097 A | * | 10/1976 | Sitton | 118/425 |
| 4,012,267 A | * | 3/1977 | Klein | 156/178 |
| 4,260,143 A | | 4/1981 | Kliger | |
| 4,326,905 A | * | 4/1982 | Tanaka | 156/149 |
| 4,380,483 A | | 4/1983 | Kliger | |
| 4,434,121 A | | 2/1984 | Schaper | |
| 4,473,217 A | | 9/1984 | Hashimoto | |
| 4,489,922 A | | 12/1984 | Fesko | |
| 4,763,882 A | * | 8/1988 | Nishiyama | 267/33 |
| 4,765,602 A | | 8/1988 | Roeseler | |
| 4,773,633 A | | 9/1988 | Hinz et al. | |
| 4,942,013 A | * | 7/1990 | Palmer et al. | 264/511 |
| 4,976,812 A | | 12/1990 | McConnell et al. | |
| 4,991,827 A | * | 2/1991 | Taylor | 267/149 |
| 5,084,221 A | * | 1/1992 | Matsuno et al. | 264/103 |
| 5,098,493 A | * | 3/1992 | Taylor | 156/87 |
| 5,122,933 A | * | 6/1992 | Johnson | 362/32 |
| 5,194,190 A | * | 3/1993 | Kim | 264/25 |
| 5,310,167 A | * | 5/1994 | Noll, Jr. | 267/33 |
| 5,312,499 A | * | 5/1994 | Bolick et al. | 156/48 |
| 5,340,511 A | * | 8/1994 | Morgan et al. | 264/29.2 |
| 5,440,660 A | * | 8/1995 | Dombrowski et al. | 385/102 |
| 5,549,370 A | | 8/1996 | Folsom | |
| 5,558,393 A | | 9/1996 | Hawkins et al. | |
| 5,576,030 A | * | 11/1996 | Hooper | 425/112 |
| 5,597,431 A | * | 1/1997 | Grosjean et al. | 156/169 |
| 5,603,490 A | * | 2/1997 | Folsom | 267/149 |
| 5,658,648 A | * | 8/1997 | Doerr et al. | 428/195 |
| 5,685,525 A | * | 11/1997 | Oguri et al. | 267/148 |
| 5,942,182 A | | 8/1999 | Hoge et al. | |
| 5,988,612 A | | 11/1999 | Bertelson | |
| 6,004,492 A | * | 12/1999 | Lewit et al. | 264/46.4 |
| 6,005,191 A | * | 12/1999 | Tzeng et al. | 174/102 R |
| 6,036,900 A | * | 3/2000 | Munk et al. | 264/102 |
| 6,040,397 A | | 3/2000 | Hooper et al. | |
| 6,047,586 A | * | 4/2000 | Hannen | 72/262 |
| 6,051,314 A | * | 4/2000 | Girgis | 428/375 |
| 6,139,942 A | * | 10/2000 | Hartness et al. | 428/298.1 |
| 6,191,227 B1 | * | 2/2001 | Matsuoaka et al. | 525/240 |

* cited by examiner

Primary Examiner—Christopher P. Schwartz  
Assistant Examiner—Benjamin A Pezzlo  
(74) Attorney, Agent, or Firm—Foley & Lardner

(57) ABSTRACT

A composite cord assembly is used to fabricate high performance structures. In one form the cord assembly is composed of an inner composition of structural fibrous material and an external cladding. Resin is impregnated into the fibrous material. The external cladding functions as a containment device for liquid resin material during the fabrication of structural parts. The cured resin surrounds the fibrous material, and provides support to the fibers, as well as load transfers between the fibers. In addition, the cord assembly may contain an inner core and other enhancements to promote resin flow through the assembly during the resin infusion/injection process used for part fabrication. Applications for composite cord assemblies of this type include composite coil springs, structural fencing, golf club shafts, fishing rods, and other products composed of structural rods and tubes of simple or complex shapes.

73 Claims, 9 Drawing Sheets

COMPOSITE CORD ASSEMBLY

BACKGROUND ART

Several patents teach coiled composite springs and include the following:

Fiber material forms are proposed and include unidirectional or twisted fibers/tows (U.S. Pat. Nos. 4,473,217, 4,765,602 and 5,558,393), wound fibers (U.S. Pat. Nos. 5,549,370, 5,603,490, and 5,988,612), braided fibers (U.S. Pat. Nos. 4,260,143, 4,380,483, 4,434,121 and 4,976,812), and bi-directional fabrics (U.S. Pat. Nos. 4,489,922 and 4,773,633);

One series of patents (U.S. Pat. Nos. 5,549,370 and 5,603,490) suggest a core surrounded by an external "cladding" of wound fibers at a specific orientation for optimum strength;

Selected composite (fiber-resin) material forms include resin bath impregnation/wet lay-up of dry fibers/fabric (stated or implied in almost all patents), and pre-impregnated tape and fabric;

Tooling materials include a cylindrical mandrel with grooves for location of the composite material (U.S. Pat. Nos. 4,260,143, 4,380,483, 4,473,217 and 5,558,393);

Some tooling concepts propose "continuous" molding processes where the mandrel rotates as new material is feed at one end and cured material is removed from the opposite end (U.S. Pat. Nos. 4,434,121 and 5,988,612);

One patent (U.S. Pat. No. 4,773,633) suggests drawing tubing over "spring wire" composed of resin saturated fabric strips wound in a helical manner at ±45° over a rod shaped retainer to fix the shape of the spring wire; The patent states that it is beneficial if the tubing is heat shrinkable to "press excess resin out of the spring wire and prevent crack formation during curing". This can be done "progressively" along the wire to drive out air inclusions. The patent also suggests that the same tubing can be eliminated by thermal or chemical decomposition.

The above enumerated patents are incorporated herein by reference.

SUMMARY OF THE INVENTION

The present invention provides a composite cord assembly ideal for shaping and molding into high performance structure such as coil springs, fencing, fishing rods, and golf club shafts. In fact, anything composed of a rod or tube-like cross-section can be fabricated with said composite assembly. In the coil spring area, for example, the cord assembly coils may be advantageously used in high performance racing cars where weight is of prime concern as well as for mountain bikes where weight and strength have driven the use of composite materials in frame design and other components. The invention also has application in the field of design of ultra modern lighting fixtures, for example, where cantilevered structures require strong light weight supports and where power or optical fibers may be advantageously passed through the cord assembly structure. In accordance with an embodiment of the invention, such power and/or optical fibers may be carried within a core region of the cord assembly. The invention also has use as a support structure for tables, in chair designs and the like where custom shaping may be combined with high strength and light weight.

The invention has the advantage of being flexible (or formable) for manipulation into desired shapes, and requires minimal (or no) tooling for fabrication into rigid structure. In one example, the composite assembly consists of a package of fibers enclosed by an external cladding.

BRIEF DESCRIPTION OF DRAWINGS

Embodiments of the invention are described in reference to the following drawings in which.

DESCRIPTION OF THE PREFERRED EMBODIMENTS

Figure 1A:
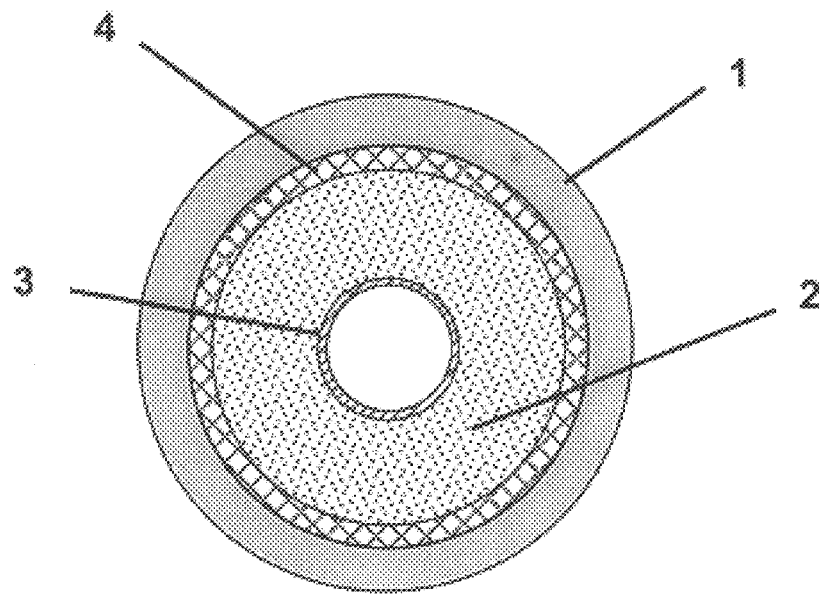
FIG. 1A illustrates a cross-section view of a composite cord assembly having a channeled inner core.

Recent developments in resin formulation have led to a class of low viscosity, low energy cure resins ideally suited for manufacture of high performance structural parts from the composite cord assemblies previously described. One such resin is taught by Hoge et al in U.S. Pat. No. 5,942,182 and is available from Ciba Specialty Chemicals Corporation, Tarrytown, N.Y. Another resin was developed by Hooper et an and is described in U.S. Pat. No. 6,040,397 and is available from Blue Max Products of Corona Calif., and BJB Enterprises, Incorporated of Tustin, Calif. Both of these patents are incorporated herein by reference.

Initially in fabrication, the material is placed in the desired shape and infused with a low viscosity resin at room temperature, or a relatively low temperature (typically < 160° F.). The resin is drawn from one end, or various locations of the part, and travels to the opposite end, or multiple locations along the part, where vacuum pressure can be applied. The resin may also be injected under pressure into the part, and the vacuum pressure may be used to assist the resin flow. The cladding acts both as an artery for resin flow, and a containment vessel for the resin. Upon infusion/injection, the composite continues to be held in place, and is cured at room temperature or relatively low temperature to achieve the desired structural properties.

The Hoge et al resin, has certain advantages in that it has a long working life (about 16 hours), is a one part system and has a shelf life at room temperature of over one year. The Hooper et al resin may be infused at room temperature (as opposed to about 160° F. for Hoge et al) but has a shorter working life (about 8 hours) and may be formulated as a one part or two part system. The one part system needs to be refrigerated and has a shelf life of about one month. The cure times vary with the cure temperature utilized. In the Hoge et al resin, the cure time is about 8 hours at 200° F., whereas in Hooper et al, the cure time is 8 hours at about 140° F. or 4 hours at about 200° F.

When the cord assembly of the invention is utilized with glass fibers, the resin of choice is an epoxy vinyl-ester resin, such as Derakane® made by Dow Chemical Company or D.E.N.™ epoxy novolac resins also made by Dow Chemical Company. These types of resin need not be heated to be cured, and while they are not suitable for carbon fibers, they are ideal for glass fibers.

In the manufacture of composite coil springs the composite cord assembly may be wrapped in a helical manner around a mandrel which defines the inner circumference of the spring. Tension, or other mechanical spacing means, are utilized to define the turns per unit length of the coil spring. The composite assembly, itself, then establishes the coiled spring cross-section. Upon final cure, mechanical spacers (if utilized) are removed, and the composite coiled spring can be slid off one end of the mandrel.

Previously suggest methods (e.g., U.S. Pat. No. 4,260,143) for tooling envisioned a cylindrical mandrel with grooves for location of the composite material. Although not specifically discussed, removal of the cured composite coil spring from the tooling implies the need for complex "breakaway" (multi-part) tooling. The composite cord assembly proposed herein greatly simplifies the tooling requirements for manufacture of a composite coil spring and produces structure with superior physical characteristics.

Resins may be pre-impregnated in the composite cord assembly for elimination of the need to process the resin into a part at a production site for the structural application. This embodiment may provide broader use of the basic product form, as skills and equipment for transferring the resin into a part would not be required for manufacture of structural parts.

Figure 1B:
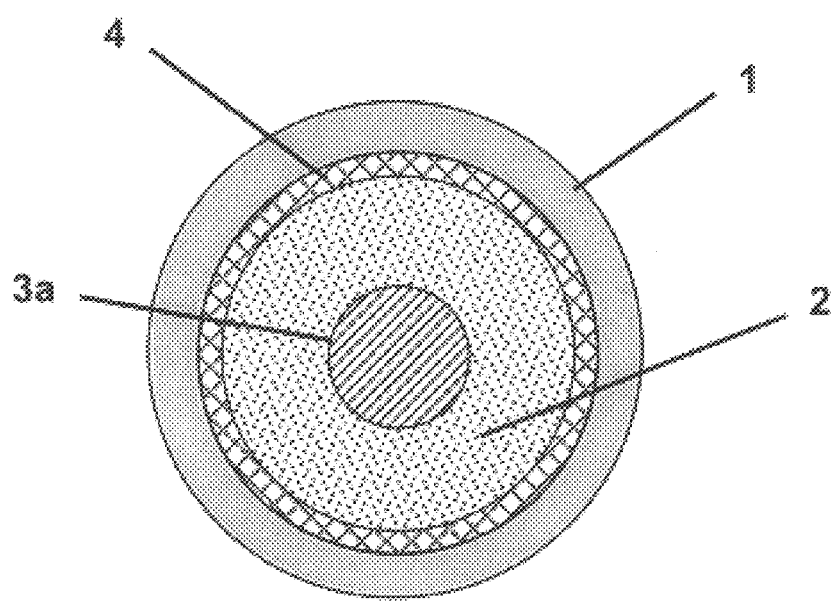
FIG. 1B illustrates a cross-section view of a composite core assembly having a solid or filled inner core.

An embodiment of the composite cord assembly cross-section is illustrated in FIG. 1A. The assembly is composed of a cladding 1 surrounding primary fibers 2. The primary fibers 2 may also be displaced from the center of the assembly by an inner core 3. The inner core 3 of FIG. 1A is shown as containing a channel which may be used to carry electrical and/or optical conductors or for transport of liquids/gases as explained below. Optionally, the inner core 3 may be solid as shown by the solid inner core 3a illustrated in FIG. 1B. The solid inner core 3a may be used as a filler material and may be made from a foam rod, plastic rod or tube. In another embodiment, the solid inner core 3a may be one or more optical fibers which can be used to carry light and/or optical signals for signaling and/or communication purposes or for visual inspection or observation purposes. It should also be understood that the inner core 3 and 3a in FIGS. 1A and 1B are optional. In addition, a region 4 is optionally provided between the primary fibers 2 and the primary cladding 1 as shown in FIGS. 1A and 1B. This region 4 may consist of a fiber/wire over-wrap, fabric on inner surface of cladding 1 to provide a textured inner surface of the cladding.

The primary purpose of the cladding 1 is to provide containment of the resin during the resin infusion/injection process. Preferably, the cladding is flexible, so that it may be easily formed into numerous shapes. To this end, the cladding may comprise a flexible thermoplastic tubing. The thermoplastic tubing may also shrink upon heating to provide compaction to the primary fibers during cure of the structure. The compaction of the fibers may serve to increase the mechanical properties of the structure.

The cladding may be transparent or translucent to view progress of the resin flow during the infusion/injection process. This feature serves as a quality control enhancement, facilitating part production.

In another embodiment, the cladding is formable, and may be comprise a thin metal tubing, e.g., copper tubing, so that the composite cord assembly can be force into a desired shape, and that shape maintained upon removal of the shaping forces, and prior to infusion/injection of the resin.

The cladding can also provide impact resistance to the internal composite structure, which is prone to damage from impacts on its' surface. Claddings composed of thermoplastics can be easily beneficial in this capacity.

In applications where the primary fibers are used to transmit electrical current or heat, the cladding may provide insulation from the electricity or from the heat.

The interior walls of the cladding may also be textured with a pattern, or contain rib-like members to provide space/paths for the resin to flow between the outer circumference of the fiber form and the inner circumference of the cladding. This type of feature helps to circumvent the tendency of the cladding to "collapse" and inhibit the flow of resin into the primary structural fibers.

Figure 2A:
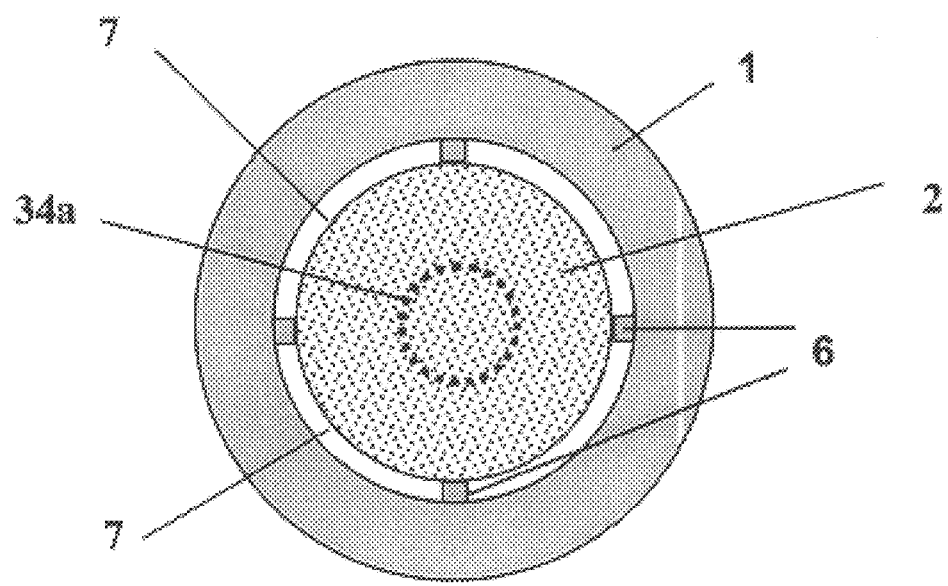
FIGS. 2A–2C illustrate cross section views of different examples of forming pathways for rapid infusion/injection of resin into the composite cord assembly.

An example of one of the concepts is illustrated in FIG. 2A, where four internal ribs 6 define bridged areas 7 between the inner circumference of the cladding and the outermost fibers of the fiber form. Ribbed plastic tubing suitable for such a cladding structure may be obtained from Teel Plastics, Inc. When vacuum is applied (e.g. infusion) and/or resin is injected, the bridged areas 7 forms natural paths for the resin to flow rapidly over the outer circumference of the fiber form. Once the resin flows to encapsulate the exterior of the fiber form, it must only infiltrate through the thickness of the fiber form to complete the resin infusion/injection process. This type of feature can serve to dramatically reduce the time required for part fabrication.

Figure 2B:
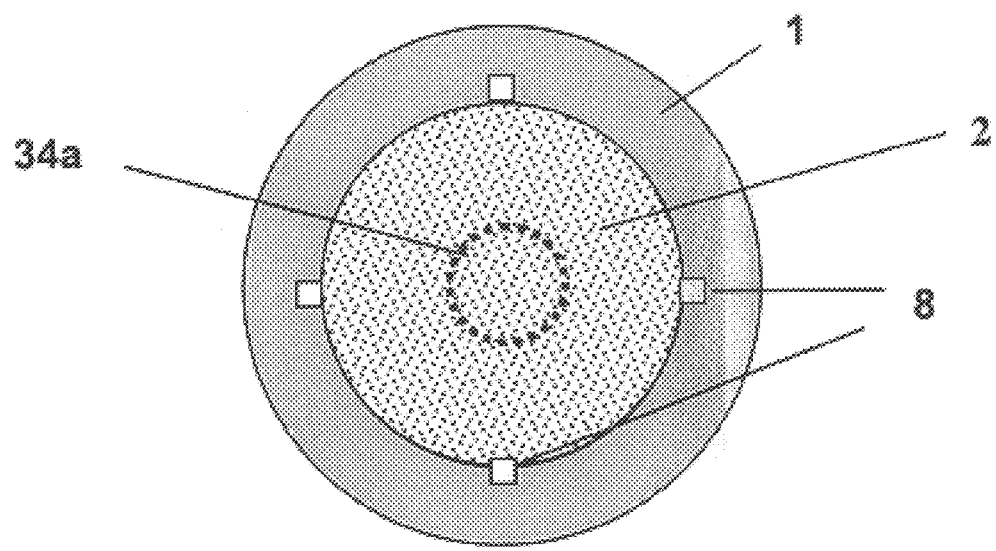

An alternate construction of a flexible tubing is shown in FIG. 2B in which channels 8 are formed in the cladding and serve to provide flow channels or pathways for the resin during the infusion/injection process.

Figure 2C:
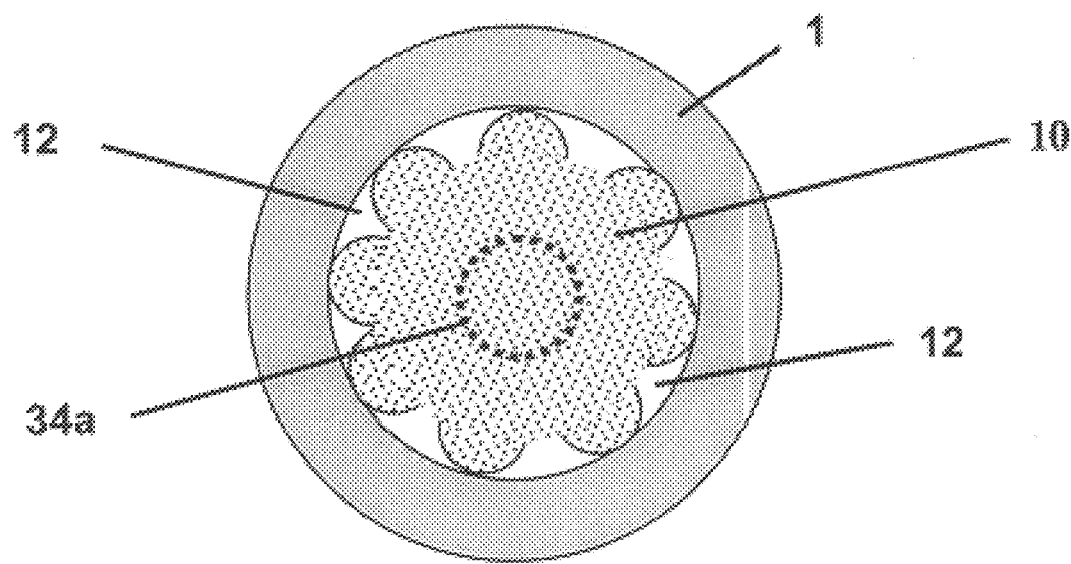

Yet another method to facilitate resin flow is to utilize a cylindrical inner cladding wall and to utilize a braided or textured primary fiber structure 10 as illustrated in FIG. 2C. In this embodiment, the natural unevenness or waviness of the outer surface of the braided primary fiber structure 10 provides natural pathways 12 for the resin to flow during the infusion/injection process.

Figure 2D:
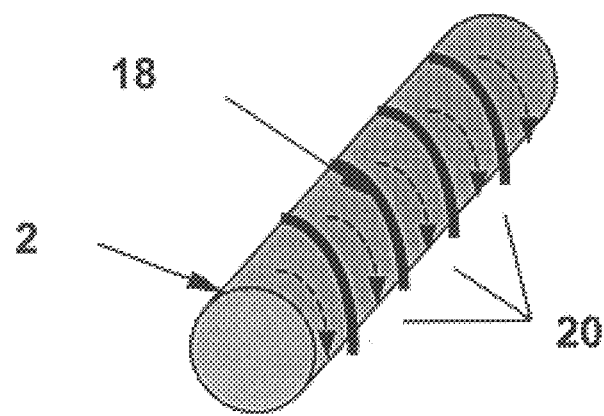
FIG. 2D—is a perspective view showing a wire over-wrap to facilitate resin flow.

According to yet another embodiment of the invention, the resin may be rapidly infused as illustrated in FIG. 2D. A thin strand, filament, or wire 18 (i.e., an over-wrap) can be wrapped in a helical manner over the assembly of primary fibers 2 to create a helical flow path 20 around the primary fibers. Resin flows along the length of the fiber assembly via the flow path 20 and then through the primary fiber's thickness to rapidly infuse the part.

Figure 2E:
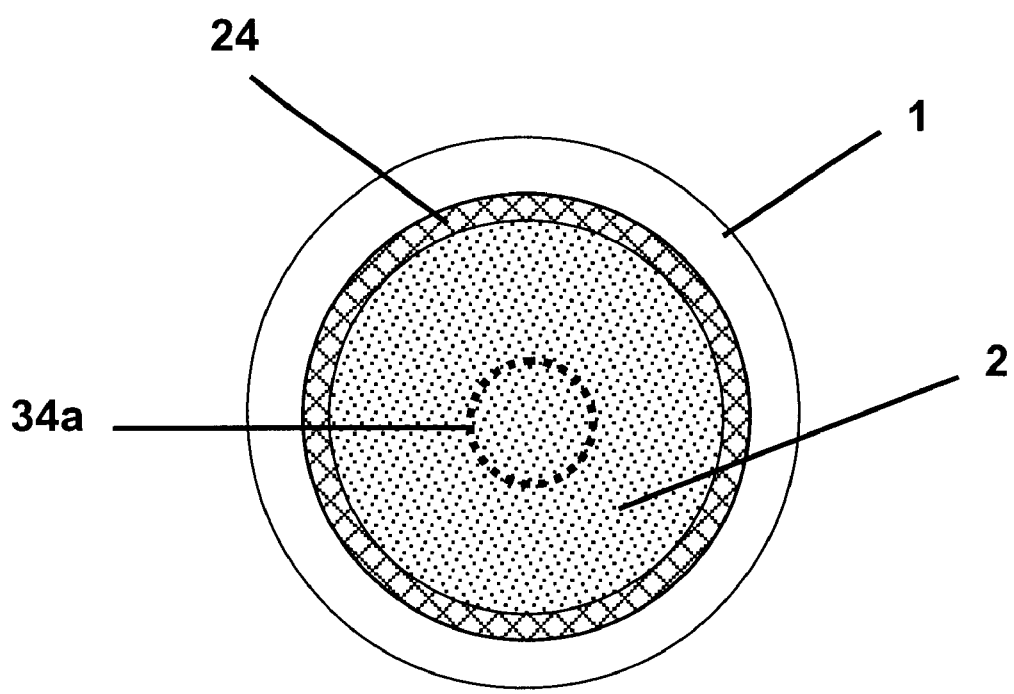
FIG. 2E is a cross-sectional view of another embodiment of a permeable mesh material which may be used as an over-wrap.

A further embodiment is shown in FIG. 2E in which a permeable mesh material 24 is substituted in place of the wire over-wrap 18 for rapid infusion of resin into the primary fibers 2. The mesh material may include, for example, a wire mesh material.

Figure 3A:
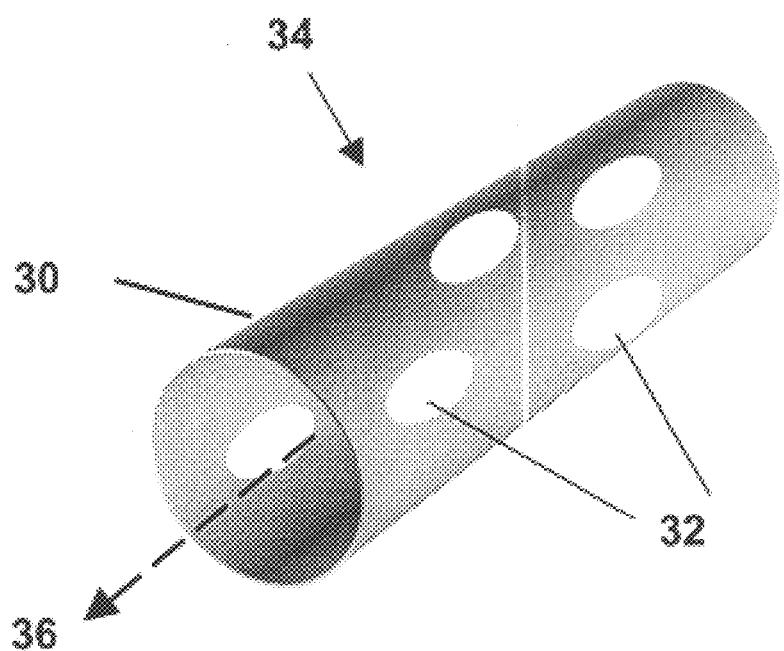
FIGS. 3A–3B illustrate a perspective and cross section view respectively of another embodiment utilizing an inner tube having perforations therein for rapid infusion/injection of resin into the composite cord assembly.
Figure 3B:
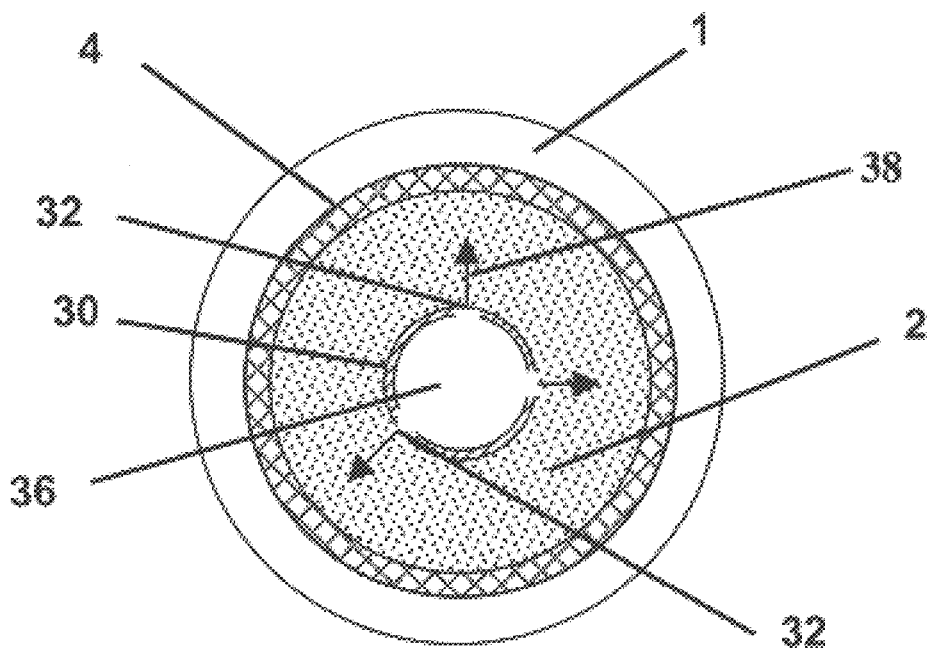

A further embodiment is shown in FIGS. 3A and 3B. In this embodiment, a hollow tube 30 having a plurality of apertures 32 is provided and serves as an inner core 34. This inner core 34 may be positioned within the cord assembly in the same place as the inner core 3 shown in FIG. 1A.

As illustrated in FIGS. 3A and 3B, the perforated tube 30, facilitates the transport of resin throughout the primary fibers 2 since the resin is able to flow, generally under pressure (or vacuum), into the fibers 2 through the apertures 32 after passing along a primary flow channel 36 along the length of the tube 30. The primary flow channel 36 is axial along the length of the tube whereas a radial flow channel 38 results from the flow of the resin through the apertures 32. The resin flows through apertures 32 while it is traveling from one end of the tube 30 to the other end along the axial length of the tube 30 during infusion/injection.

The embodiments of FIGS. 2A–2E show non-limiting examples of how the cladding may be constructed to facilitate infusion/injection of the resin into the primary fibers by facilitating transport of the resin along the outer surface of the primary fibers and between the cladding inner surface and the primary fiber outer surface. The embodiment of FIGS. 3A and 3B, shows a non-limiting example of the construction of the inner core 3 (FIG. 1A) which may facilitate infusion/injection of the resin into the primary fibers by facilitating transport of the resin through the core so as to permit resin to flow in a radial direction outwardly from the core, through the primary fibers and toward the outer surface of the primary fibers. The two techniques may be combined with one another as desired. For example, the apertured tube 30 may optionally be used as an inner core as illustrated by the doted circle 34a in FIGS. 2A–2C and 2E.

The primary fibers 2 for all of the embodiments described, provide structural stiffness/strength to the end product. These fiber materials may consist of carbon/graphite, glass, or other man-made structural fibers. The carbon fibers may be graphite fibers as well as amorphous carbon fibers as those terms are known in the art, as described, for example, in U.S. Pat. No. 4,260,143 the entirety of which is incorporated herein by reference. The carbon fibers may have a diameter of approximately 7 microns as do the glass fibers (e.g., s-glass). The fibers may also be provided as a single type (a homogeneous ensemble) or in combination with one another (a heterogeneous ensemble) or either the homogeneous or heterogeneous ensemble may be formed in combination with metal wires, for example, to develop unique characteristics not obtainable with a single fiber material. Further, it is understood that the fibers are typically wrapped around the inner core and the preferable structure is that of a braided (e.g., bi-axial or tri-axial) fiber bundle as shown in cross section in FIG. 2C. Whenever the inner core is hollow, it must be sufficiently rigid to permit the wrapping of the fibers without collapse of the inner core itself. (A plan view of a braided structure is shown, for example, in the aforementioned U.S. Pat. No. 4,260,143 at FIG. 1 thereof).

Figure 4A:
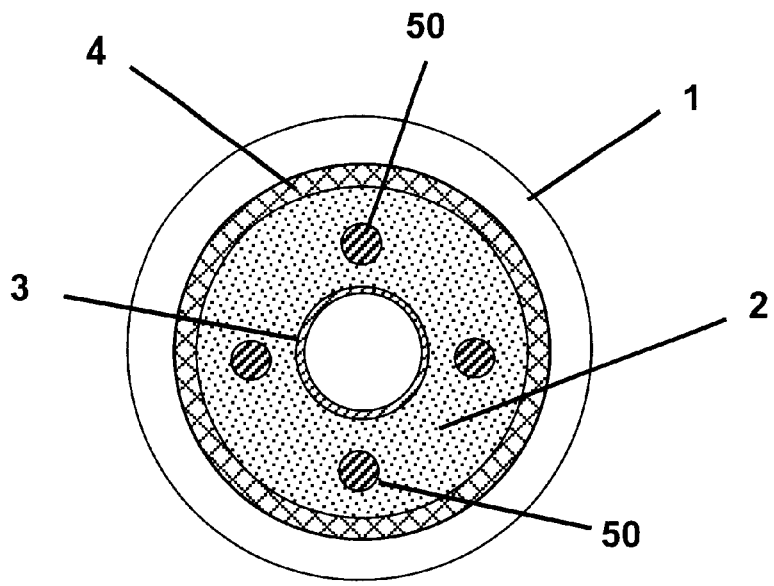
FIG. 4A is a cross sectional view of an embodiment of the invention using electric wires within the primary fibers.

An example of the use of a metal wire is shown in FIG. 4A in which a plurality of wires 50 are spaced within the array of primary fibers 2. While the plurality of wires 50 have been illustrated, it is clear that a single wire may also be used. These wires 50 may be used to run electrical current for the end product, or may be used to heat the resin during part fabrication.

Figure 4B:
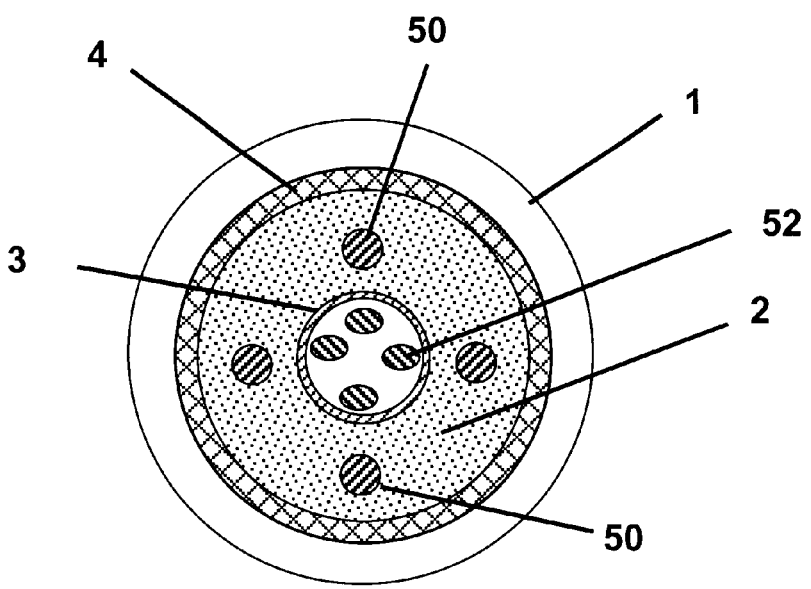
FIG. 4B is a cross sectional view of an embodiment of the invention adding to FIG. 4A the use of core lines within a core of the cord assembly.

An example of another embodiment of the invention is illustrated in FIG. 4B in which the inner core 3 (FIG. 1A) or 34 (FIGS. 3A) is used to house a plurality of core lines 52 which may be electrical power lines, electrical signal or data lines, optical fiber communication lines, optical fibers for visual light transport and the like as representative and non-limiting examples. The type of signal or light transmitted through the inner core will depend on the application in which the cord assembly is used. The embodiment of FIG. 4B may be used with our without the conductors 50 embedded within the primary fibers 2.

The fibers may consist of unidirectional filamentary tows, twisted tows, or braided construction. In particular braided cord is well suited for application in composite coil springs. The bias angle construction of the tows in the braid may be designed to resist the shear stresses which develop in the coil spring when under load. Furthermore, the surface texture of the outer surface of the braided cord may provide natural channels for resin flow over the primary fibers 1 during resin infusion as explained in connection with FIG. 2C.

To provide increased structural efficiency, the primary fibers may be displaced from the center of the composite cord assembly by an inner core 3 as illustrated in FIGS. 1A and 1B. Moving the fibers away from the center of the assembly increases the stiffness of the cross-section for bending and torsion loads. While the core 3 has been described as being hollow to permit resin and/or conductors or wires and/or a gas or liquid to pass therethrough, the core may also be solid. In this manner, the inner core may act merely as a filler material to reduce the amount of primary fiber material required for structural adequacy. Examples of possible filler materials include a foam rod, or plastic rod or tube.

As illustrated in FIG. 4B, the inner core may provide a cavity for electrical wiring or optical fiber communication or light transmission. In addition, when the inner core is left hollow or effectively hollow, the inner core may serve as a conduit for the flow of gas or liquid in the part in its' end use. One example for the use of the cord assembly would be for glass blowing in which part of the rod used to blow glass may be made of the light weight composite cord assembly with a hollow inner core 3 (FIG. 1A) to permit air from the glass blower to pass therethrough. Because of the extreme temperatures used in glass blowing, the end of tube inserted within the furnace would be made of metal but the cooler regions of the tube could be made of the composite cord assembly.

Figure 5:
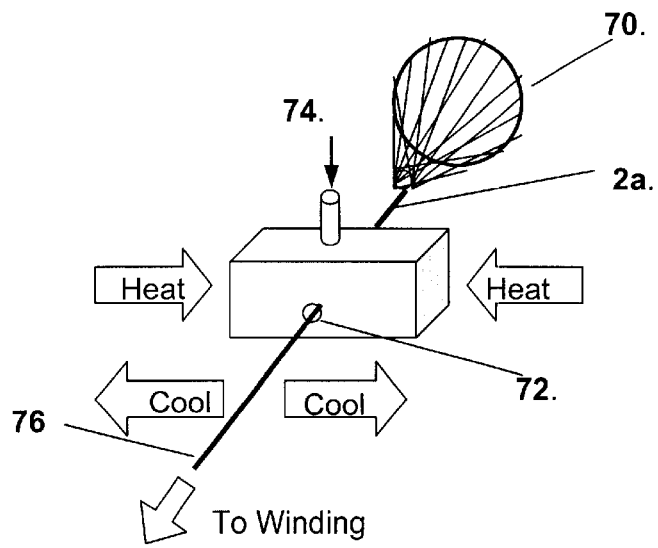
FIG. 5 illustrates a composite cord assembly fabrication process.

One automated process for producing a composite cord assembly is illustrated in FIG. 5. The process consists of the primary fibers in the form of a braided cord 2a produced by a braiding machine 70, being pulled through a heated die 72, where plastic 74 is extruded over the primary fibers, cooled as a composite cord assembly 76 and then wound into spools. The resin may then be infused/injected into the fibers.

The resin may be pre-impregnated into the primary fibers of the composite cord assembly for elimination of the need to process the resin into a part at a production site for the structural application. The resin is impregnated after the cord assembly 76 exits the die 72 in FIG. 5 using the apparatus shown in FIG. 6. This pre-impregnation may provide broader use of the basic product form, as skills and equipment for transferring the resin into a part would not be required for manufacture of structural parts. The final stage manufacturing need only involve final shaping of the fiber assembly and heating the resin to fully cure it (i.e., without the need for any infusion/injection). The pre-impregnated fibers may be stored in a refrigerator (e.g., the freezer section at a temperature, of about 0° C.) prior to their final curing.

The term pre-impregnation is meant to include the process infusing the resin into the fibers, as by means of infusion/injection, followed by a partial curing of the resin. The resulting cord assembly is stored in a cooled state and later shaped to a desired form and fully cured to retain the desired final shaping.

Thus, in accordance with this embodiment of the invention, there is provided a method of manufacturing an end product, such as a coil, in which resin infusion/injection is carried out at a main manufacturing site having suitable equipment for resin infusion/injection. Also at the main site, the resin is partially cured and the end product, e.g., coil is only partially formed into the desired coil shape. The purchaser of the partially cured and partially formed end product, e.g.,. coil, typically located at a remote manufacturing site, will then finally shape the end product, e.g., coil and then heat the coil to fully cure the resin thus finishing the end product fabrication. The heating may be done electrically with the embodiment of FIGS. 4A or 4B by passing a suitable current through the cord assembly along the conductors 50. In yet another embodiment, the heating may be done using the wire 18 of FIG. 2D which would serve both the function of providing pathways for resin flow and also for heating the resin to partially or fully cure it once it has been infused into the primary fibers. This embodiment would not require the remote site manufacturer to have heating ovens.

The final shaping at the remote site may be accomplished by wrapping the coil around a mandrel of the desired diameter (typically smaller than the initial coil diameter) and wrapping it with the desired spacing. The final shaping at the remote manufacturing site is advantageous from the perspective of both the main site manufacturer and the remote site manufacturer. From the perspective of the main site manufacturer, efficiencies and economies of scale may be obtained from producing only a single (or a relatively small number) of end products, e.g., coils. From the perspective of the remote site manufacturer (which may be an intermediate manufacturer, distributor or even an end customer) the single end product shape purchased (e.g., coil shape) may be finally shaped into many different forms suitable for an ultimate end customer and the remote site manufacturer may provide custom shapes and spring tensions depending upon demand and application all the while ordering only the single coil (or a relatively small number of coils) compared to the number and variety manufactured at the remote site).

In the case of a coil, the main site manufacturer may supply, for example, a relatively large diameter wind with large spacings between windings (loops of the coil), and this large diameter/spacing coil would be the partially formed product supplied to the remote site manufacturer. Of course, the resin within this partially formed product is partially cured so that the partially formed product will retain its shape during shipment and handling, but yet still be relatively easily bendable and formable into other shapes as desired by the remote manufacture. In an alternate embodiment, the coil supplied by the main site manufacturer may be of intermediate diameter (as compared to remote site final product coils which would be both larger and smaller than the intermediate diameter) and could be relatively tightly wound to save space during shipping to the remote site manufacturer. In this case, the remote site manufacturer would pull the coil apart to provide a more loose winding on an appropriately size mandrel.

The composite cord assembly thus comprises the primary structural fibers (e.g., unidirectional filamentary tows, twisted tows, or braided construction), with or without an inner core and with or without an intermediate over-wrap wherein the primary structural fibers have the cladding material surrounding the structural fibers to serve for resin containment during resin infusion.

Figure 6:
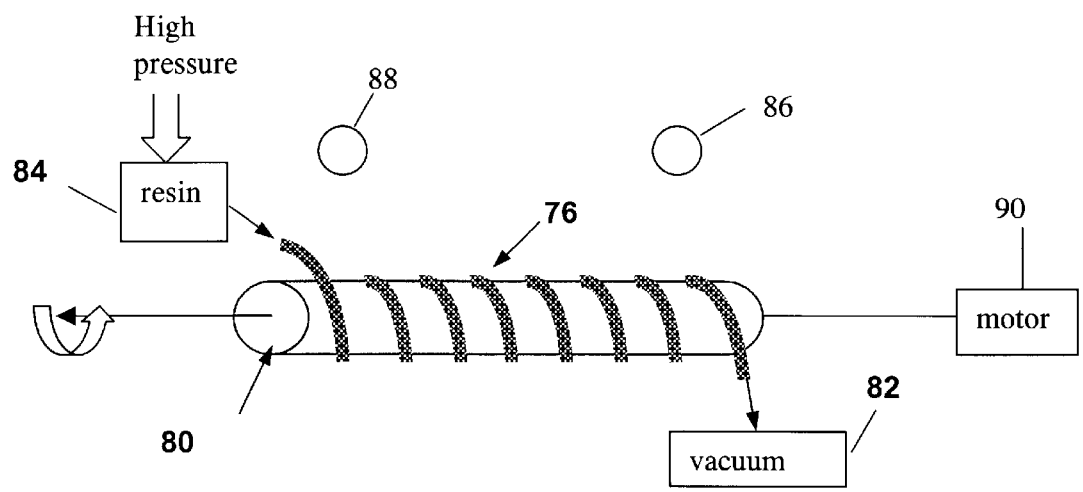
FIG. 6 illustrates a composite cord spring resin infusion/injection process.

An exemplary application of the composite cord assembly is for the fabrication of composite coil springs as illustrated in FIG. 6. After exiting the apparatus of FIG. 5, a length of the composite cord assembly is cut which would correspond to the desired length needed for fabrication of the final end product, such as a coiled spring in the representative example. The length of the composite cord assembly 76 is wrapped around a mandrel 80 in a helical manner to produce the shape of the coil spring. No grooves are required in the mandrel to form the spring cross-section, as the composite cord assembly is self-contained and defined within the cladding. Vacuum is drawn from one end of the assembly indicated at 82 to infuse the resin from a reservoir 84 located at the opposite end. In addition or alternately, the resin may be forced through the core assembly by using high pressure applied to the resin reservoir 84 at the opposite end. The term "infusion" is generally used to mean pulling the resin through the fibers by means of a vacuum whereas the term injection is used to indicate that the resin is pushed through the fibers as by means of a high pressure on the input side. Clearly one or both of these processes may be used and the term infusion/injection has been used throughout this written description to mean one or the other or both of these processes. Once resin has completely infiltrated the primary fibers, the part is partially or fully cured by thermal heat, or other means, such as electron beam curing.

Figure 7:
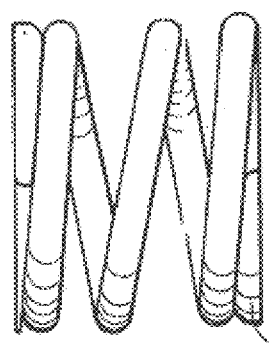
FIG. 7 illustrates a formed coil or spring.

Tension, or other mechanical spacing means, may be utilized to define the turns per unit length of the coil spring. The composite assembly, itself, then establishes the coiled spring cross-section. Upon final cure, mechanical spacers (not shown) between the cord assembly 76 and the mandrel 80 (if utilized) are removed, and the composite coiled spring can be slid off one end of the mandrel. The resulting shape of coil is shown in FIG. 7 as a non-limiting example.

An alternative method of providing the cladding material on the primary fibers is to utilize an oversized heat shrinkable cladding and simply inserting the fibers into the cladding. The cord assembly (primary fibers and cladding) may then be infused/injected with resin and: (1) left uncured but with the ends of the cladding sealed after infusion/injection, e.g., by heat shrinking, and the cord assembly cured and shaped in a downstream process; (2) partially cured with the ends of the cladding fully or partially sealed, e.g., by heat shrinking the cladding and with the cord assembly partially or fully shaped and (3) shaped and then fully cured wherein in the process of curing the resin, the cladding will shrink since the shrinking temperature of the cladding is much less than that of the resin. Where the cord assembly has core, one may, in addition to (1)–(3) above one may insert the primary fibers into the oversized cladding (tube) and then heat shrink the cladding to fight tightly around the assembly of primary fibers. The resin may be infused/injected by passing through the core the core as taught, for example, in FIGS. 3A and 3B. As examples, one may utilize heat shrinkable tubs made from polyolefin or polyvinylidene fluoride such as SMS, TES, EPS-300, or 3M special purpose tubing Kynar® all made by 3M, Electrical Products Division, Austin, Tex. Shrink ratios range from 4:1 to 2:1.

The cladding may be made of a transparent or translucent material so as to facilitate visual inspection as to the progress of the infusion/injection process. Plastic tubing is an ideal choice for such a cladding material. The cladding may serve the purpose of not only containing the resin during manufacture but according to other embodiments, the cladding may serve to provide electrical insulation or heat insulation resulting from an electric current running through the fibers, especially where the fibers are made of carbon or a composite-metal hybrid.

Exemplary heat treating devices for partially or fully curing the resin are illustrated by the thermal lamps 86 and electron beam (E-beam) device 88. During curing, the mandrel 80 may be rotated by means of motor 90 so that the entire cord assembly is more uniformly exposed to the curing apparatus.

The cladding may be made from a semi-rigid material such as a copper tube in which case it may retain its shape before resin infusion. In other cases, such as when using a thin plastic tubing as the cladding, the tubing is wound around a mandrel as described and then the resin in infused.

While partial curing is generally desired as part of the pre-impregnation process, according to another embodiment of the invention, the resin may be infused/injected and the ends of the cladding pinched off and sealed without any curing of the resin. In this manner, the sealing of the resin within the cladding retains the resin in place and the cord assembly may be freely formed and cured at a later time being stored at a cool temperature in the meantime.

Embodiments of the invention are useful when the cord assembly is produced partially at a main site and takes its final form at a second, remote site. For example, the main manufacturing site may supply a sealed and uncured cord assembly or a partial cured cord assembly and the remote site may shape the cord assembly and supply the curing needed to fully cure the resin. The main manufacturing site may ship sealed cladding with uncured resin and the remote manufacturing site may do all of the shaping and all of the curing need to form the final product of the cord assembly without the need for any infusion/injection apparatus.

Figure 8:
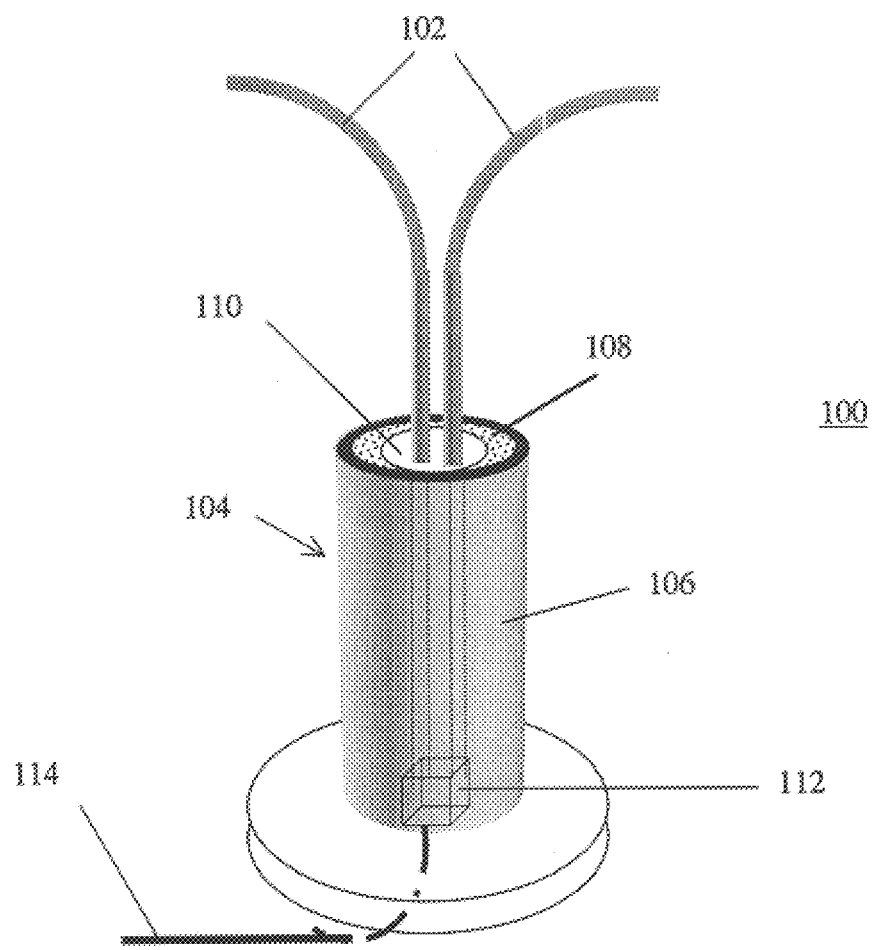
FIG. 8 shows a novelty item end product utilizing an embodiment of the composite core assembly.

Fully shaped and cured resin is produced at the main manufacturing site when the product is not sent to a remote site manufacture for any additional shaping, although, of course, a remote site manufacture may incorporate the cured cored assembly into a final product with additional components as during the manufacture of golf clubs, shafts, fishing rods, and other products composed of complex shaped structural rods and tubes FIG. 8 shows the use of the composite cored assembly in a lighting device employing optical fibers and used, for example, as a display item or novelty item. As shown in FIG. 8, there is provided an optical fiber novelty item 100 made of a plurality of optical fibers 102. While only two such fibers are shown, generally, 20–30 such fibers would be used. The novelty item 100 contains a cord assembly 104 which is fabricated to include a cladding 106, primary fibers 108 (carbon, glass etc as described above in relation to FIG. 1A) and a hollow inner core 110. The optical fibers pass through the inner core 110 and connected to a light source/coupler 112 which contains a light source and is used to couple the light from the light source to the optical fibers. The light source of the source/coupler 112 is supplied with electric current from power cord 114.

Figure 9:
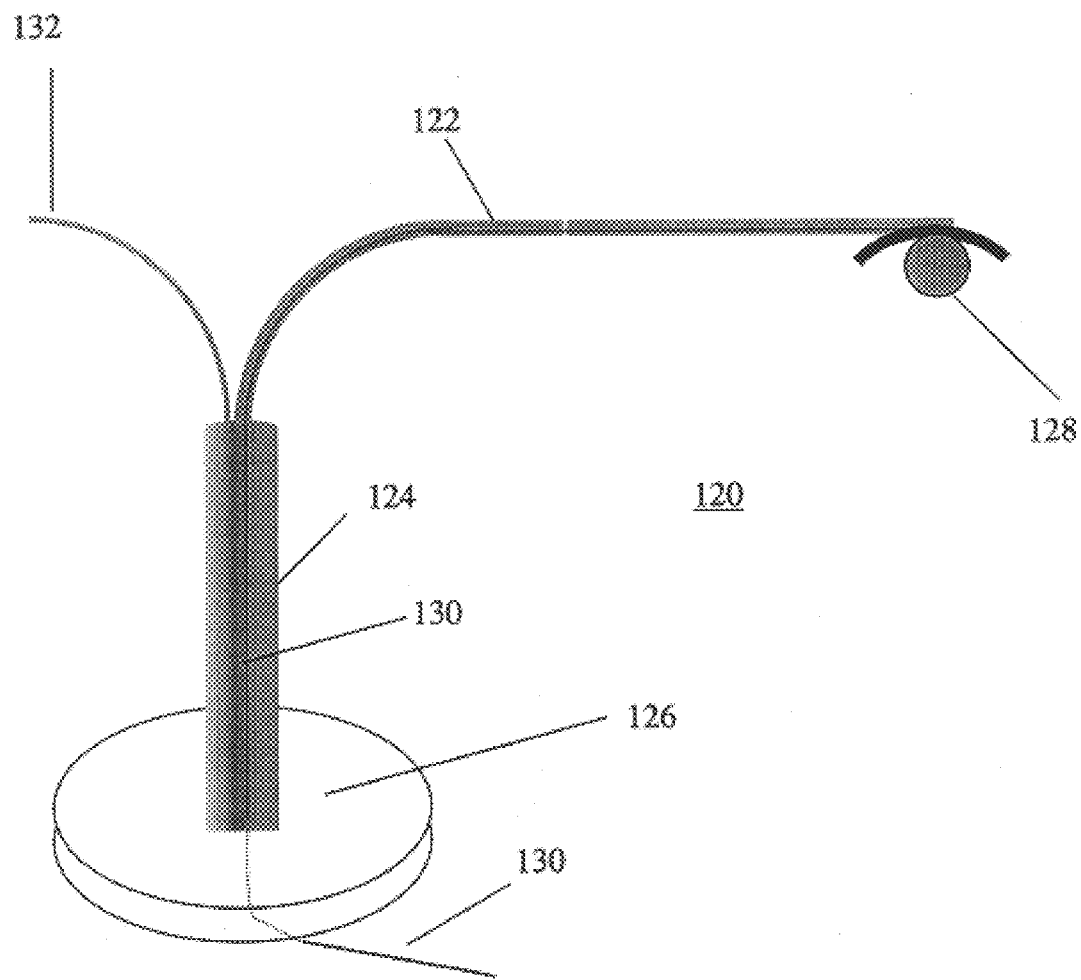
FIG. 9 shows a lamp structure utilizing an embodiment of the composite cord assembly.

FIG. 9 shows another application of the composite cord assembly in a lighting fixture of modern design. Such lighting fixtures are typically cantilevered and require relatively great strength and preferably are light weight, requirements ideally suited for the composite cord assembly. As shown in FIG. 9, there is provided a lamp 120 having a first cord assembly 122 of a relatively small diameter and a second cord assembly 124 of a relatively larger diameter. The second cord assembly 124 is connected to a base 126. A lamp 128 (such as a tensor, incandescent or florescent lamp) is attached to the end of the first cord assembly 122. A wire 130 providing electric power to the lamp 128 is fed through the first and second cord assemblies 124 and 122. The construction of the cord assemblies may be as indicated in FIGS. 1A, 2B–2C, 2E, 3B, or 4A–4B. In the case of a hollow inner core 3 (FIG. 1A or 4B for example) the wire 130 may pass through the hollow inner core as in core line 52 of FIG. 4B. Alternately, the wire 130 may be one of the conductors 50 of FIG. 4A. Also illustrated in FIG. 9 is an optical fiber 132 which may be used as a decorative illuminator as part of the lamp 20. The optical fiber 132 may pass through the second cord assembly 124 in the same fashion as the wire 130 and may be coupled to a light source/coupler as in FIG. 8 (i.e., see element 112 of FIG. 8).

While the first cord assembly 122 of FIG. 9 has been illustrated as a relatively straight segment, it can take on various custom shapes and designs due to the high strength and light weight properties of the composite cord assembly. Custom shapes may be produced at a remote site manufacturer by infusion/injection of the resin at a main manufacturing site with shaping and curing being performed at a second site on an as desired basis.

Additional applications for composite cord assemblies include structural fencing, golf clubs shafts, fishing rods, and other products composed of complex shaped structural rods and tubes.

While the particular embodiments of the invention have been described in reference to the written specification and figures, it will become apparent to those of skill in the art that modifications and improvements may be made within the teachings of the invention as defined by the appended claims.

What is claimed is:

1. A composite cord assembly comprising an assembly of braided primary fibers surrounding by a cladding;
    wherein said cladding has an inner surface and includes at least one of (1) channels or (2) ribs along said inner surface for facilitating flow of resin during manufacturing of said composite cord assembly.

2. The composite cord assembly as recited in claim 1 wherein said assembly of primary fibers comprise a plurality of carbon fibers.

3. The composite cord assembly as recited in claim 1 wherein said assembly of primary fibers comprise a plurality of glass fibers.

4. The composite cord assembly as recited in claim 2 wherein each of said plurality of carbon fibers has a diameter of approximately 7 microns.

5. The composite cord assembly as recited in claim 1 wherein said cladding is flexible.

6. The composite cord assembly as recited in claim 1 wherein said cladding comprises a heat shrinkable cladding.

7. The composite cord assembly as recited in claim 4 wherein aid cladding comprises a transparent material.

8. The composite cord assembly as recited in claim 1 wherein said cladding comprises a translucent material.

9. The composite cord assembly as recited in claim 5 wherein said flexible cladding comprises a plastic material.

10. The composite cord assembly as recited in claim 1 wherein said cladding comprises a metal tube.

11. The composite cord assembly as recited in claim 10 wherein the metal tube comprises a bendable copper tube.

12. The composite cord assembly as recited in claim 1 further comprising a resin which is at least partially cured and which is at least partially dispersed through said assembly of primary fibers.

13. The composite cord assembly as recited in claim 1 further comprising a resin which is fully cured and which is dispersed through said assembly of primary fibers.

14. The composite cord assembly as recited in claim 1 further comprising an uncured resin disposed through said assembly of primary fibers.

15. The composite cord assembly as recited in claim 14 wherein said cladding has sealed ends for retaining said uncured resin within said composite cord assembly.

16. The composite cord assembly as recited in claim 12 wherein said cladding has sealed ends for retaining said at least partially cured resin.

17. The composite cord assembly as recited in claim 1 further comprising a partially cured resin disposed through said assembly of primary fibers.

18. The composite cord assembly as recited in claim 4 further comprising a resin which is only partially cured and which is at least partially dispersed through said assembly of primary fibers.

19. The composite cord assembly comprising:

an assembly of primary fibers;

a flexible cord disposed within said assembly of primary fibers such that said primary fibers surround said core; and wherein said cladding has an inner surface and includes at least one of (1) channels or (2) ribs along said inner surface for facilitating flow of resin during manufacturing of said composite cord assembly.

20. The composite cord assembly as recited in claim 19, wherein said core comprises an optical fiber.

21. The composite cord assembly as recited in claim 19, wherein said core comprises a filler material.

22. The composite cord assembly as recited in claim 19, further comprising at least one electrical conductor distinct from said plurality of primary fibers and disposed within said composite cord assembly.

23. The composite cord assembly as recited in claim 19, wherein said core has a central channel.

24. The composite cord assembly as recited in claim 23 further comprising at least one electrical conductor passing through said central channel.

25. The composite cord assembly as recited in claim 23 further comprising at least one optical conductor passing through said central channel.

26. The composite cord assembly as recited in claim 19 wherein said core comprises a tube having a central open channel along the longitudinal length thereof and a plurality of apertures along the surface of said tube and passing from said channel to said assembly of primary fibers.

27. The composite cord assembly as recited in claim 19 further comprising a material in the form of a mesh disposed between said core and said assembly of fibers, said mesh facilitating resin flow during manufacture of said composite cord assembly.

28. The composite cord assembly as recited in claim 1 further comprising at least one heat conductor within said assembly of fibers for heating said resin during manufacturing of said composite cord assembly.

29. The composite cord assembly as recited in claim 28 wherein said heat conductor is in the form of an electrical wire which generates heat when an electric current passes therethrough.

30. The composite cord assembly as recited in claim 1, wherein said assembly of fibers comprises heterogeneous fibers.

31. The composite cord assembly as recited as recited in claim 1 further comprising at least one electrical conductor distinct from said assembly of primary fibers and disposed within said assembly of fibers.

32. The composite cord assembly as recited in claim 1 wherein said cladding is of an effective thickness and strength to provide impact resistance to said composite cord assembly.

33. The composite cord assembly as recited in claim 1 wherein said plurality of fibers has a helical wire wrapped on the surface thereof and disposed between said plurality of fibers and said cladding.

34. The composite cord assembly as recited in claim 33 further comprising a resin disposed throughout said plurality of fibers, wherein said helical wire defines pathways for flow of said resin during manufacture of said composite cord assembly.

35. The composite cord assembly as recited in claim 34 wherein said helical wire is an electric heating wiring suitable for providing heat to said resin for curing same.

36. A coil comprising:

a) a plurality of braided fibers;

b) a cladding separate and distinct from said plurality of braided fibers and covering said plurality of braided fibers;

c) a resin dispersed throughout said plurality of fibers but not within said cladding;

d) wherein said plurality of braided fibers, said cladding and said resin form a composite structure in the form of a coil; and wherein said cladding has an inner surface and includes at least one of (1) channels or (2) ribs along said inner surface for facilitating flow of resin during manufacturing of said coil.

37. The coil as recited in claim 36 wherein said plurality of fibers comprise carbon fibers.

38. The coil as recited in claim 36 wherein said plurality of fibers comprises glass.

39. The coil as recited in claim 37 wherein each of said plurality of fibers has a diameter of approximately 7 microns.

40. The coil as recited in claim 36 wherein said cladding comprises a heat shrinkable cladding.

41. The coil as recited in claim 36 wherein said plurality of fibers comprise carbon fibers.

42. The coil as recited in claim 41 wherein said plurality of fibers comprise glass.

43. The coil as recited in claim 36 wherein each of said plurality of fibers has a diameter of approximately 7 microns.

44. The coil as recited in claim 36 wherein said plurality of fibers comprises a braided assembly of fibers.

45. The coil as recited in claim 44 wherein said cladding comprises a heat shrinkable cladding.

46. A spring comprising:

a core;

a plurality of braided fibers surrounding said core;

a cladding separate and distinct from said plurality of braided fibers and covering said plurality of braided fibers; and a partially cured resin at least partially dispersed throughout said plurality of braided fibers but not within the cladding;

wherein said cladding has an inner surface and includes at least one of (1) channels and (2) ribs along said inner surface for facilitating flow of resin during manufacturing of said spring;

wherein said plurality of braided fibers, said cladding and said resin form a composite structure in the form of a spring.

47. The spring as recited in claim 46 wherein said plurality of fibers comprises glass fibers.

48. The spring as recited in claim 46 wherein said plurality of fibers comprise carbon fibers.

49. The spring as recited in claim 46 wherein each of said plurality of fibers has a diameter of approximately 7 microns.

50. The spring as recited in claim 46 wherein said cladding comprises a heat shrinkable cladding.

51. The spring as recited in claim 46 wherein said core comprises a tube having a central open channel along the longitudinal length thereof and a plurality of apertures along the surface of said tube and passing from said channel to said plurality of fibers.

52. The spring as recited in claim 46 further comprising a material disposed over said core to provide a helical over-wrap for said core.

53. The spring as recited in claim 46 further comprising a material in the form of a mesh disposed between said core and said plurality of fibers, said mesh facilitating resin flow during manufacture of said spring.

54. The spring as recited in claim 46 further comprising at least one heat conductor within said plurality of fibers for heating said resin during the manufacturing of said spring.

55. The spring as recited in claim 54 wherein said heat conductor comprises a metal wire.

56. A method of forming a composite assembly comprising the steps of:
    a) braiding together a plurality of fibers; then
    b) covering said braided plurality of fibers with a cladding, so that said cladding surrounds said braided plurality of fibers, and then;
    c) forcing a resin to flow along at least one of (1) channels and (2) ribs of said cladding and through said braided plurality of fibers, said cladding at least partially containing said resin.

57. A method of forming a composite assembly as recited in claim 56 further comprising the step of
    at least partially curing said resin.

58. A method as recited in claim 47 further including the steps of:
    partially curing said resin and then, forming said composite assembly into a desired shape and fully curing said resin.

59. A method of forming a composite assembly as recited in claim 56 further comprising the step of:
    forming said composite assembly into a desired shape and curing the resin.

60. A method of forming a composite assembly as recited in claim 59 wherein said curing step comprises initially only partially curing said resin, and said method further includes the steps of:
    cooling said resin
    retaining said composite assembly in a cooled state to prevent further curing of the resin of said composite assembly;
    removing composite assembly from the cooled state,
    shaping the composite assembly to said desired shape, and
    fully curing the resin of the composite assembly.

61. A method of forming a composite assembly as recited in claim 56 including the steps of shaping said composite assembly into a desired shape and then fully curing said resin.

62. A method of forming a composite assembly comprising the steps of:
    overlaying a plurality of fibers on a flexible central core, said central core having a central channel region and a cylindrical surface region of the central channel region, said cylindrical surface region having a plurality of apertures therethrough;
    covering said plurality of fibers with a cladding;
    forming said cladding with at least one of (1) channels or (2) ribs along an inner surface thereof for facilitating flow of resin along the outer surface of said plurality of fibers; and
    forcing a resin to pass through at least one of said channels and along said ribs and through said central channel region and through said plurality of apertures to impregnate said plurality of fibers, said cladding at least partially containing said resin.

63. A method as recited in claim 62 further comprising the step of:
    at least partially curing said resin.

64. A method of forming a composite assembly comprising the steps of:
    a) braiding together a plurality of un-impregnated fibers;
    b) inserting said un-impregnated braided plurality of fibers into an oversized cladding having one of (1) channels or (2) ribs along an inner surface thereof;
    c) forcing a resin to flow along said channels or ribs and through said un-impregnated braided plurality of fibers, said cladding at least partially containing said resin and said plurality of fibers thereby being impregnated with said resin, and
    d) heat shrinking said cladding,
    e) wherein the order of the steps is one of (1) *a*), *b*), *c*), *d*) and (2) *a*), *b*), *d*), and *c*).

65. A method as recited in claim 64 further comprising the step of at least partially curing said resin.

66. A method of forming a composite assembly comprising the steps of:
    a) grouping together a plurality of fibers;
    b) inserting said plurality of fibers into an oversized cladding;
    c) forming said cladding with at least one of (1) channels or (2) ribs along an inner surface thereof for facilitating flow of resin along the outer surface of said plurality of fibers;
    d) forcing a resin to flow through said plurality of fibers, said cladding at least partially containing said resin, and
    e) heat shrinking at least the ends of said cladding.

67. A method of manufacturing a product comprising the steps of:
    at a first location;
    forming a composite cord assembly including a plurality of fibers and a cladding surrounding said plurality of fibers;
    forcing a resin to flow along the length of said plurality of fibers by providing open regions between said cladding and said plurality of fibers, said resin impregnating said plurality of fibers;
    partially curing said resin within said plurality of fibers;
    at a second location;
    shaping said composite cord assembly into a desired shape; and
    fully curing said resin.

68. The method as recited in claim 64, wherein the composite cord assembly is partially formed at said first location.

69. The method as recited in claim 64 wherein at said first location, there is additionally performed the step of embedding an electrical heating wire within the composite cord assembly and wherein at said second location the step of curing said resin includes the passing an electric current through said electrical heating wire.

70. A method of manufacturing a product comprising the steps of:

at a first location:

forming a composite cord assembly including a plurality of fibers and a cladding surrounding said plurality of fibers;

forcing a resin to flow in at least one open region between said cladding and said plurality of fibers and throughout said plurality of fibers;

sealing said cladding to prevent resin from escaping;

at a second location;

shaping said composite cord assembly into a desired shape; and curing said resin.

71. The method as recited in claim 70 wherein at said first location, there is additionally performed the step of embedding an electrical heating wire within the composite cord assembly and wherein at said second location the step of curing said resin includes the passing an electric current through said electrical heating wire.

72. The composite cord assembly as recited in claim 19 wherein said assembly of primary fibers is a braided assembly.

73. A composite cord assembly comprising an assembly of primary fibers surrounded by a cladding wherein said plurality of fibers as a helical wire wrapped on the surface thereof and disposed between said plurality of fibers and said cladding.

* * * * *